(12) United States Patent
Axe et al.

(10) Patent No.: US 11,698,253 B1
(45) Date of Patent: Jul. 11, 2023

(54) WEIGHT BAR LEVEL ATTACHMENT

(71) Applicants: Kyle A. Axe, Bremerton, WA (US);
Daniel J. Geary, Bremerton, WA (US)

(72) Inventors: Kyle A. Axe, Bremerton, WA (US);
Daniel J. Geary, Bremerton, WA (US)

( * ) Notice: Subject to any disclaimer, the term of this patent is extended or adjusted under 35 U.S.C. 154(b) by 394 days.

(21) Appl. No.: 17/114,891

(22) Filed: Dec. 8, 2020

(51) Int. Cl.
*G01C 9/34* (2006.01)
*A63B 21/072* (2006.01)
*A63B 1/00* (2006.01)
*G01C 9/28* (2006.01)
*A63B 21/00* (2006.01)
*A63B 71/06* (2006.01)

(52) U.S. Cl.
CPC .................. *G01C 9/34* (2013.01); *A63B 1/00* (2013.01); *A63B 21/072* (2013.01); *A63B 21/4035* (2015.10); *G01C 9/28* (2013.01); *A63B 2071/0694* (2013.01)

(58) Field of Classification Search
CPC ..................................... G01C 9/28; G01C 9/34
USPC ................................. 33/347, 370–373, 379
See application file for complete search history.

(56) References Cited

U.S. PATENT DOCUMENTS

| | | | |
|---|---|---|---|
| 3,213,545 A | 10/1965 | Wright | |
| D220,124 S * | 3/1971 | Powell | A63B 21/0724 D10/69 |
| 4,888,875 A | 12/1989 | Strother | |
| 4,908,949 A * | 3/1990 | Jaccard | A61C 1/08 33/372 |
| 6,029,359 A * | 2/2000 | Szumer | G01C 9/28 33/465 |
| 6,131,298 A | 10/2000 | McKinney et al. | |
| 6,223,596 B1 | 5/2001 | Wilkins | |
| 6,532,676 B2 * | 3/2003 | Cunningham | G01C 15/008 33/286 |
| 6,568,095 B2 | 5/2003 | Snyder | |
| 7,089,676 B2 | 8/2006 | Godinez | |
| 7,676,940 B2 * | 3/2010 | Spaulding | G01C 9/28 33/383 |
| 8,602,945 B1 * | 12/2013 | Haubrich | A63B 21/072 482/901 |
| 8,870,717 B2 * | 10/2014 | Pfitzer | A63B 21/015 482/106 |
| 8,888,665 B2 * | 11/2014 | Pfitzer | A63B 21/075 482/109 |
| 9,623,285 B1 | 4/2017 | Ruiz | |
| 9,885,571 B2 * | 2/2018 | Hoppe | G01C 9/34 |
| 11,383,123 B2 * | 7/2022 | Reibman | A63B 21/0724 |
| 11,547,223 B1 * | 1/2023 | Hassett | A47G 1/205 |
| 2004/0194329 A1 | 10/2004 | Drahos et al. | |
| 2008/0052934 A1 | 3/2008 | Hall | |
| 2022/0074741 A1 * | 3/2022 | Millane | G01C 9/34 |

* cited by examiner

*Primary Examiner* — George B Bennett
(74) *Attorney, Agent, or Firm* — Cramer Patent & Design, PLLC; Aaron R. Cramer

(57) ABSTRACT

A level attachment having a cylindrical tubing with a first half and a second half is capable of being removably secured about a weight lifting bar. A first embodiment employs a magnetic attachment means and second embodiment employs a clasping means. Within the first half is disposed a spirit level.

20 Claims, 4 Drawing Sheets

WEIGHT BAR LEVEL ATTACHMENT

FIELD OF THE INVENTION

The presently disclosed subject matter is directed to a level attachment and specifically to a weight bar level attachment.

BACKGROUND OF THE INVENTION

Physical fitness and health concerns are among the areas of highest concern among Americans today. More than ever, people are frequenting health clubs and performing exercise routines at home in order to lose weight, improve muscle tone and maintain a healthy lifestyle. One common item found at almost all gyms is that of the weight set. These sets use variable weights held on a bar by use of a bar clamp. Many other pieces of gym equipment use similar bars that are also used by the arms for various chest, arm, and shoulder workouts. As the human body is symmetrical, it is important that the user keep the bar level to ensure an even workout from side to side.

However, it is common to have one side of the body to be slightly stronger than the other thus causing the user to favor that side. As such, the strong side gets even stronger, should the bar not be in a level position. As the bar is typically close to the user, it is often difficult to judge whether or not it is level. Accordingly, there exists a need for a means by which it can be verified that weight bars and similar workout bars are kept in a level configuration during use. The development of the Weight Bar Level Attachment fulfills this need.

SUMMARY OF THE INVENTION

The principles of the present invention provide for a removable weight bar bubble level, comprises a bubble vial which is contained in a divided housing. The divided housing is attached to a first bar sleeve half and a second bar sleeve half. The first bar sleeve half and the second bar sleeve half form a sleeve-like assembly with an inner tubular opening which accepts a bar. The first bar sleeve half and the second bar sleeve half is secured with a fastener. The fastener allows the first bar sleeve half and the second bar sleeve half to be opened along an opening path for application and removal to the bar. There is also a plurality of compressible foam strips which are disposed along an interior surface of both the first bar sleeve half and the second bar sleeve half The bar may be a standard weight bar, workout bar, exercise machine bar and/or an EZ bar. The fastener may be a piano-style hinge or a snap clasp. The first bar sleeve half and the second bar sleeve half may be joined together by the piano-style hinge and secured by the snap clasp. The divided housing may be on a bottom, a side, or a rotational position of the housing that maximizes visibility for the user, a partner, or a spotter. The fastener may comprise a magnetic patch. The divided housing may be made of material selected from the group consisting of high strength injection molded plastic, steel, aluminum, fiberglass, or carbon fiber. The first bar sleeve half and second sleeve bar half may be made of material selected from the group consisting of high strength injection molded plastic, steel, aluminum, fiberglass, or carbon fiber.

The compressible foam strips may provide for automatic self-adjusting and self-centering of the removable weight bar bubble level while preventing unwanted turning or rotation of the removable weight bar bubble level upon the bar. The weight bar may be in a semi-permanently installed state. The weight bar may be removed after each use and installed upon other bars in an as-needed state.

The removable weight bar bubble level may be placed at a midpoint of the bar such that the bubble vial is facing the user at all times. The bubble vial may remain visible allowing the user to make corrections to keep the weight bar level and thus optimize a workout session. The removable weight bar bubble level may be utilized with a bench press, an incline bench press, a lat pulldown machine, a smith machine, or a preacher bench. The removable weight bar bubble level the first bar sleeve half and the second bar sleeve half encircle the bar and are centered and stabilized by the compressible foam strips.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
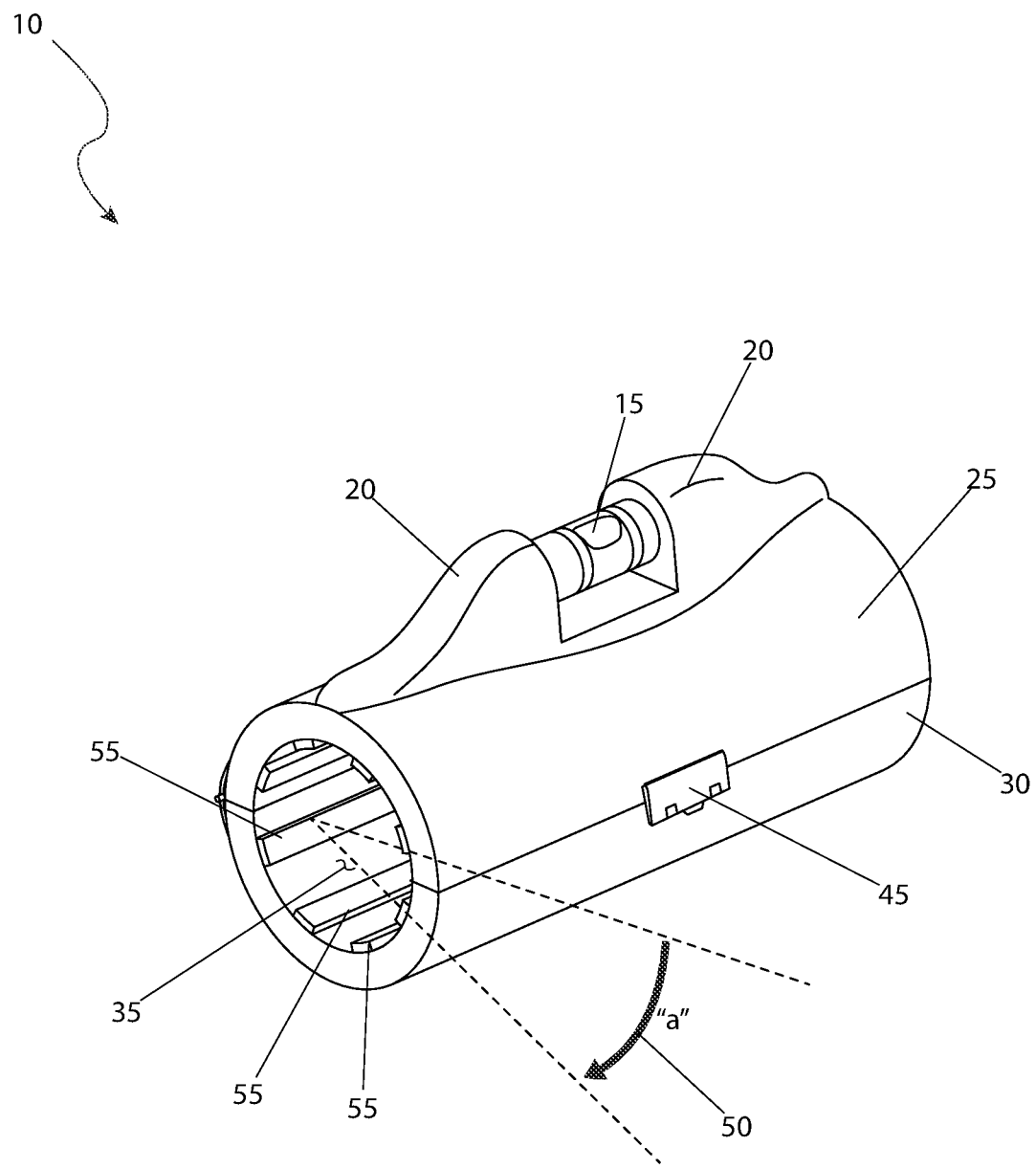
FIG. 1 is a perspective view of the removable weight bar bubble level 10, according to the preferred embodiment of the present invention.

DESCRIPTIVE KEY 10 removable weight bar bubble level
15 bubble vial
20 divided housing
25 first bar sleeve half
30 second bar sleeve half
35 inner tubular opening
40 piano-style hinge
45 snap clasp
50 opening path "a"
55 compressible foam strip
60 magnetic patch
65 user
70 exercise equipment
75 weight set
80 weight bar
85 weight
90 range of motion "m"

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the removable weight bar bubble level 10, according to the preferred embodiment of the present invention is disclosed. The removable weight bar bubble level 10 (herein also described as the "device") 10, includes an otherwise conventional bubble vial 15 contained within a divided housing 20 which in turn is attached to a first bar sleeve half 25 and a second bar sleeve half 30. It is envisioned that the divided housing 20, the first bar sleeve half 25 and the second bar sleeve half 30 would be made of high strength injection molded plastic in an injection molding process. However, other materials such as steel, aluminum, fiberglass, carbon fiber and the like may also be utilized, and as such, the material of construction of the device 10 should not be interpreted as a limiting factor of the present invention.

When positioned as shown, the first bar sleeve half 25 and the second bar sleeve half 30 form a sleeve-like assembly with an inner tubular opening 35 which accepts a standard weight bar 80, workout bar, exercise machine bar, EZ bar, or the like as will be described in greater detail hereinbelow. The first bar sleeve half 25 and the second bar sleeve half 30 is secured via use of a piano-style hinge 40 (not shown in this figure due to illustrative limitations) as well as a snap clasp 45. The piano-style hinge 40 and snap clasp 45 allow the first bar sleeve half 25 and the second bar sleeve half 30 to be opened along an opening path "a" 50 for application and removal to said bar. As the chosen bar 80 may vary in outer diameter, the device 10 is equipped with a series of compressible foam strips 55 along the interior surface of both the first bar sleeve half 25 and the second bar sleeve half 30. The compressible foam strips 55 provides for automatic self-adjusting and self-centering of the device 10 while also preventing unwanted turning or rotation of the device 10 upon said bar 80. The preferred embodiment of FIG. 1 can be left upon the weight bar 80 in a semi-permanently installed state or can be removed after each use and installed upon other bars 80 in an as-needed state. This usage is viewed as personal use upon common weight bars 80 and associated exercise equipment such as in a public gym.

Figure 2:
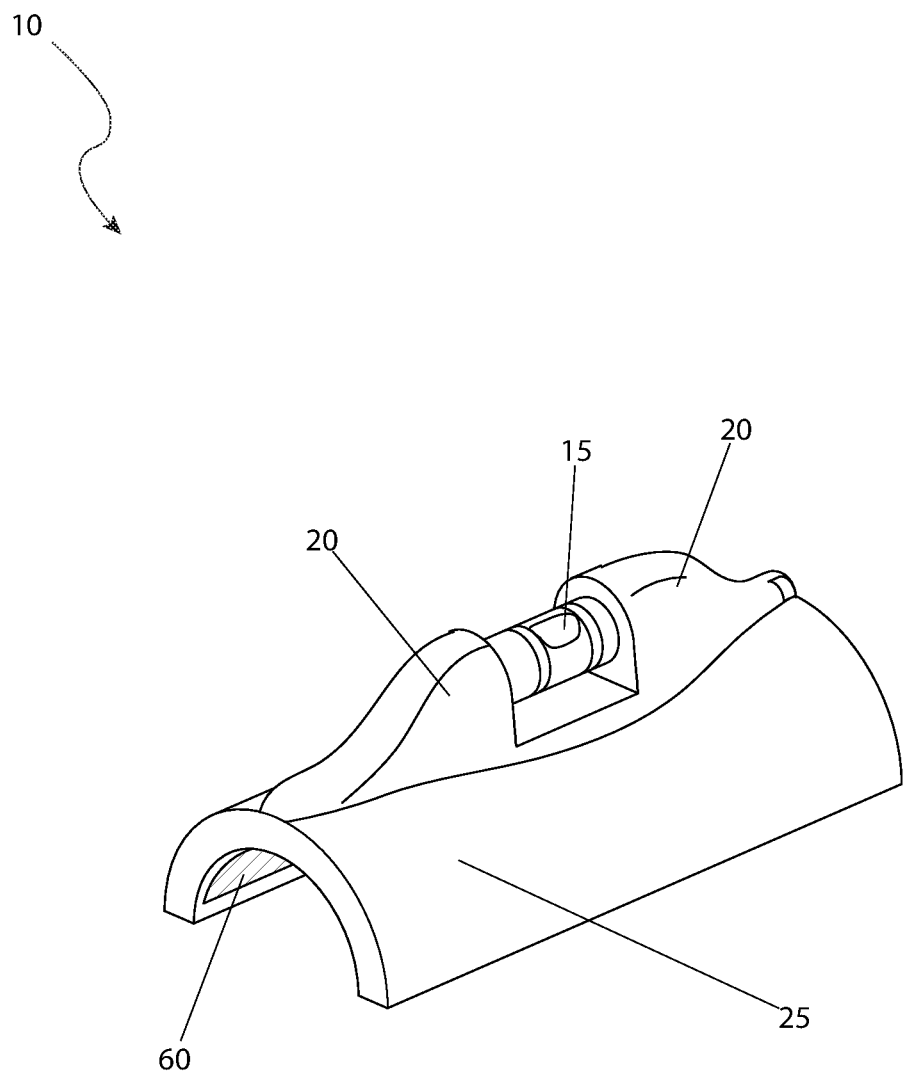
FIG. 2 is a perspective view of the removable weight bar bubble level 10, according to an alternate embodiment of the present invention.

Referring next to FIG. 2, a perspective view of the device level 10, according to an alternate embodiment of the present invention is depicted. The alternate embodiment described herein provides the same usage features as the preferred embodiment as described in FIG. 1 but provides for a differing method of attachment to the weight bar 80. The bubble vial 15 is still present along with the divided housing 20 and the first bar sleeve half 25. However in lieu of the second bar sleeve half 30, the piano-style hinge 40, the snap clasp 45 and the compressible foam strips 55 (all of which are shown in FIG. 1), the alternate embodiment provides for a magnetic patch 60. The magnetic patch 60 is used upon a standard weight bar 80, workout bar, exercise machine bar, EZ bar, or the like that are ferrous in nature. The magnetic patch 60 provides attachment capabilities to the device 10 as well as presents slippage (or rotation) of the device 10 upon the weight bar 80. It is envisioned that the magnetic patch 60 is held to the interior of the first bar sleeve half 25 using adhesive or similar attachment means. The alternate embodiment of FIG. 2 can be easily applied and removed by simply placing upon or lifting away in a manner of seconds. The ease of application lends the preferred embodiment to personalized use that is removed after each usage and is carried between weight bars 80 or between exercise machines in a public gym.

Figure 3:
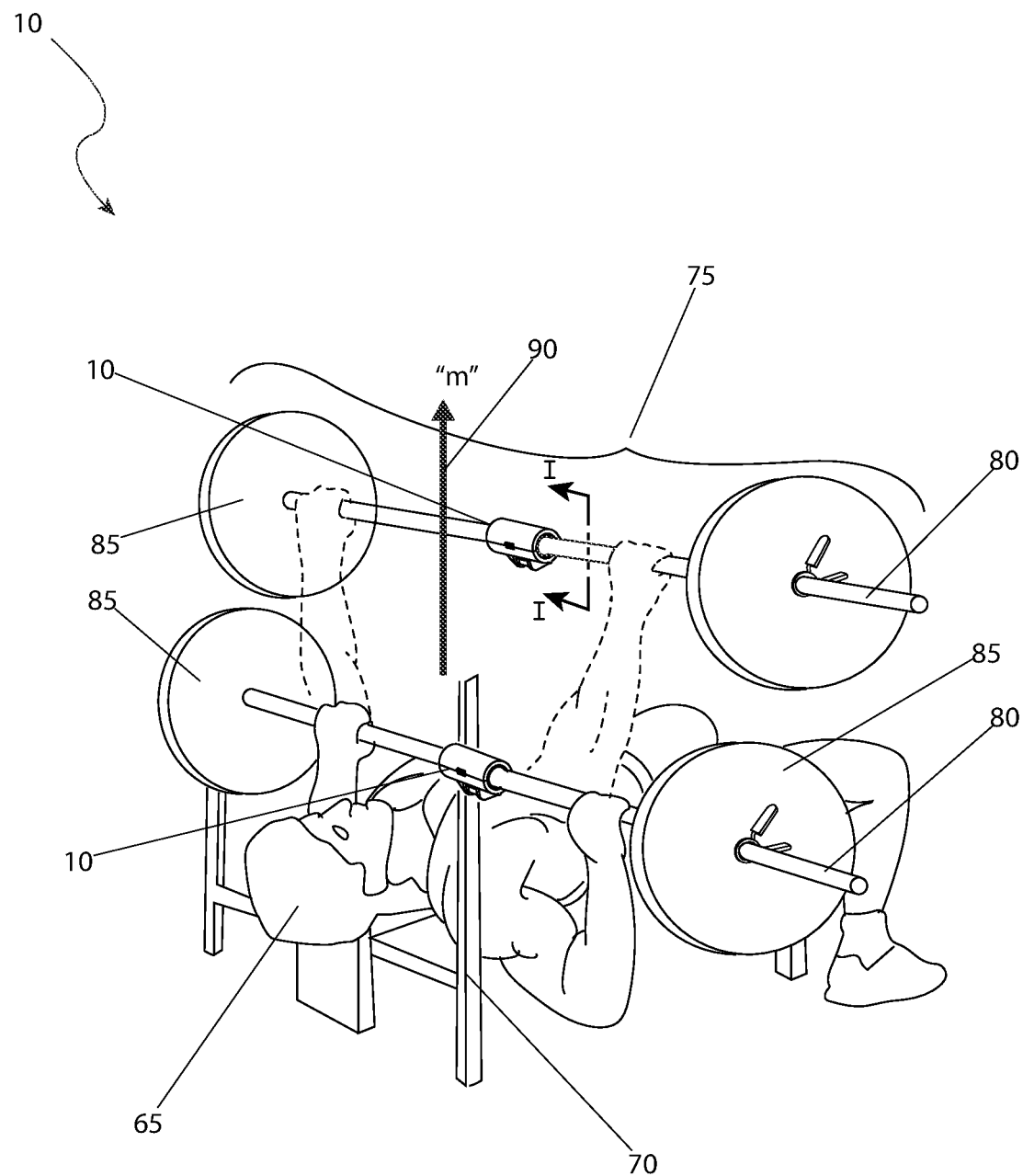
FIG. 3 is a perspective view of the removable weight bar bubble level 10, shown in a utilized state, according to bot the preferred and alternate embodiment of the present invention.

Referring now to FIG. 3. a perspective view of the device 10, shown in a utilized state, according to bot the preferred and alternate embodiment of the present invention is shown. A user 65 is shown utilizing a piece of exercise equipment 70, herein depicted as a weight bench. A weight set 75 (e.g., a barbell set having a weight bar 80 and weights 85) is utilized in a conventional manner. The device 10 is placed at the approximate midpoint of the weight bar 80 such that the bubble vial 15 (as shown in FIG. 1) is facing the user at all times. In the configuration as shown in FIG.3, the device 10 is inverted from the position as shown in FIG. 1 and FIG. 2. Thus, as the user 65 moves through a range of motion "m" 90, the bubble vial 15 remains visible allowing the user 65 to make corrections to keep the weight bar 80 level and thus optimize the workout session. Such action not only ensures safety, but also ensures that each group of muscles on each side of the body of the user 65 receives a symmetrical workout. It is noted that the same approach would be utilized with other types of weight bar 80 such as workout bar, exercise machine bar, EZ bar, or the like. In a similar manner, the same approach is utilized with different types of exercise equipment 70 including, but not limited to: a bench press, an incline bench press, a lat pulldown machine, a smith machine, a preacher bench, or the like. It is also noted that the device 10 may be placed so that the bubble vial 15 (as shown in FIG. 1 and FIG. 2) is readable/viewable by a workout partner or spotter to ensure the most beneficial workout.

Figure 4:
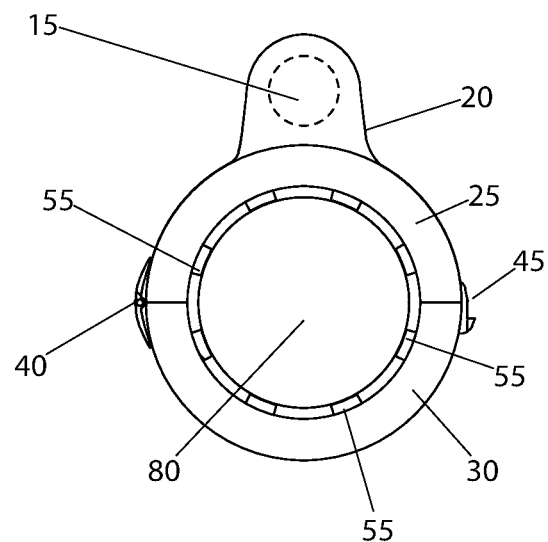
FIG. 4 is a sectional view of the removable weight bar bubble level 10, as seen along a line I-I, as shown in FIG. 3, according to the preferred embodiment of the present invention; and, FIG. 5 is a sectional view of the removable weight bar bubble level 10, as seen along a line I-I, as shown in FIG. 3, according to the alternate embodiment of the present invention.

Referring next to FIG. 4, a sectional view of the device 10, as seen along a line I-I, as shown in FIG. 3, according to the preferred embodiment of the present invention is disclosed. The first bar sleeve half 25 and the second bar sleeve half 30 encircle the weight bar 80 and are centered and stabilized by the compressible foam strips 55. As aforementioned described, the first bar sleeve half 25 and the second bar sleeve half 30 are joined together by a piano-style hinge 40 and secured by the snap clasp 45. The divided housing 20 is shown in a top mounted position with the bubble vial 15 (shown by hidden lines) on the interior. However, depending on usage patterns, the divided housing 20 may be on the bottom, sides, or any rotational position that maximizes visibility for the user 65 (as shown in FIG. 3) or partner/spotter.

Figure 5:
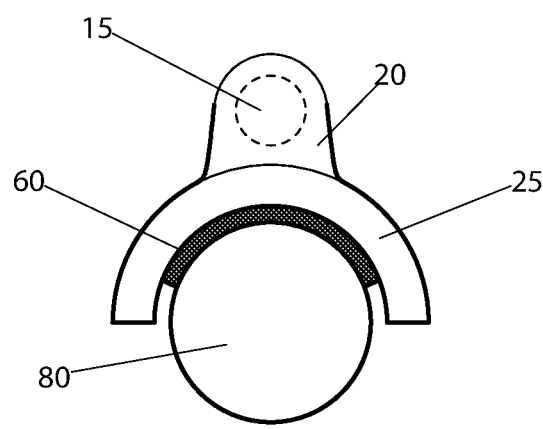

Referring to FIG. 5, a sectional view of the device 10, as seen along a line II-II, as shown in FIG. 3, according to the alternate embodiment of the present invention is depicted. Said embodiment relies on the magnetic properties of the magnetic patch 60 to attach the device 10 to the weight bar 80. As before, the bubble vial 15 (shown by hidden lines) and the divided housing 20 can be positioned at any rotational position on the weight bar 80 such that maximum visibility for the user 65 (as shown in FIG. 3) or partner/spotter is provided.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 5. The user would procure the device 10 from conventional procurement channels such as sporting good stores, discount stores, mail order/Internet stores, or the like. A decision between the universal attachment of the preferred embodiment or the magnetic attachment to ferrous weight bar 80 would be made.

After procurement and prior to utilization, the device 10 would be prepared in the following manner: in the case of the preferred embodiment, the snap clasp 45 would be disengaged, and the first bar sleeve half 25 and the second bar sleeve half 30 would be opened along the opening path "a" 50 and placed on the weight bar 80 at the approximate mid-point; the first bar sleeve half 25 and the second bar sleeve half 30 would be closed and secured via manipulation of the snap clasp 45. In the case of the alternate embodiment, the divided housing 20 would be placed at the approximate midpoint of a ferrous weight bar 80 allowing the magnetic patch 60 to magnetically engage the weight bar 80. In both cases, the bubble vial 15 would be positioned to provide the maximum visibility for either the user 65 or any workout partner/spotter.

During utilization of the device 10, the following procedure would be initiated: the user 65 would view the bubble vial 15 of the device 10 to ensure that the weight bar 80 is aligned parallel to the shoulders of the user 65 and level. As such, it is ensured that one (1) side (i.e., chest, arms, shoulders, elbows, and the like) are not favored during the workout and a workout with maximum effectiveness can take place.

After use of the device 10, it may be removed, stored and utilized on a different weight bar 80 in a repeating manner, or may be left upon the original weight bar 80 and utilized over and over.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A removable weight bar bubble level, comprising:
a bubble vial contained in a divided housing, said divided housing is attached to a first bar sleeve half and a second bar sleeve half, said first bar sleeve half and said second bar sleeve half form a sleeve-like assembly with an inner tubular opening which accepts a bar, said first bar sleeve half and said second bar sleeve half is secured with a fastener, said fastener allows said first bar sleeve half and said second bar sleeve half to be opened along an opening path for application and removal to said bar; and
a plurality of compressible foam strips disposed along an interior surface of both said first bar sleeve half and said second bar sleeve half.

2. The removable weight bar bubble level according to claim 1, wherein said bar is a standard weight bar.

3. The removable weight bar bubble level according to claim 1, wherein said bar is a workout bar.

4. The removable weight bar bubble level according to claim 1, wherein said bar is an exercise machine bar.

5. The removable weight bar bubble level according to claim 1, wherein said bar is an EZ bar.

6. The removable weight bar bubble level according to claim 1, wherein said fastener is a piano-style hinge.

7. The removable weight bar bubble level according to claim 1, wherein said fastener is a snap clasp.

8. The removable weight bar bubble level according to claim 7, wherein said first bar sleeve half and said second bar sleeve half are joined together by said piano-style hinge and secured by said snap clasp.

9. The removable weight bar bubble level according to claim 1, wherein said divided housing is on a bottom, a side, or a rotational position of said housing that maximizes visibility for said user, a partner, or a spotter.

10. The removable weight bar bubble level according to claim 1, wherein said fastener is a magnetic patch.

11. The removable weight bar bubble level according to claim 1, wherein said divided housing is made of material selected from the group consisting of high strength injection molded plastic, steel, aluminum, fiberglass, or carbon fiber.

12. The removable weight bar bubble level according to claim 1, wherein said first bar sleeve half is made of material selected from the group consisting of high strength injection molded plastic, steel, aluminum, fiberglass, or carbon fiber.

13. The removable weight bar bubble level according to claim 1, wherein said second bar sleeve half is made of material selected from the group consisting of high strength injection molded plastic, steel, aluminum, fiberglass, or carbon fiber.

14. The removable weight bar bubble level according to claim 1, wherein said compressible foam strips provide for automatic self-adjusting and self-centering of said removable weight bar bubble level while preventing unwanted turning or rotation of said removable weight bar bubble level upon said bar.

15. The removable weight bar bubble level according to claim 1, wherein said weight bar is in a semi-permanently installed state.

16. The removable weight bar bubble level according to claim 1, wherein said weight bar is removed after each use and installed upon other bars in an as-needed state.

17. The removable weight bar bubble level according to claim 1, wherein said removable weight bar bubble level is placed at a midpoint of said bar such that said bubble vial is facing said user at all times.

18. The removable weight bar bubble level according to claim 1, wherein said bubble vial remains visible allowing said user to make corrections to keep said weight bar level and thus optimize a workout session.

19. The removable weight bar bubble level according to claim 1, wherein said removable weight bar bubble level is utilized with a bench press, an incline bench press, a lat pulldown machine, a smith machine, or a preacher bench.

20. The removable weight bar bubble level according to claim 1, wherein said removable weight bar bubble level said first bar sleeve half and said second bar sleeve half encircle said bar and are centered and stabilized by said compressible foam strips.

\* \* \* \* \*